US005825489A

United States Patent [19]
Lagakos et al.

[11] Patent Number: 5,825,489
[45] Date of Patent: Oct. 20, 1998

[54] MANDRELL BASED EMBEDDED PLANAR FIBER-OPTIC INTERFEROMETRIC ACOUSTIC SENSOR

[75] Inventors: Nicholas Lagakos, Silver Spring, Md.; Joseph A. Bucaro, Herndon, Va.

[73] Assignee: The United States of America as represented by the Secretary of the Navy, Washington, D.C.

[21] Appl. No.: 202,628

[22] Filed: Feb. 28, 1994

[51] Int. Cl.[6] .................................................. G01B 9/02
[52] U.S. Cl. .............................. 356/345; 250/227.19
[58] Field of Search ...................... 356/345; 250/227.19, 250/227.27, 227.14

[56] References Cited

U.S. PATENT DOCUMENTS

| | | | |
|---|---|---|---|
| 4,322,829 | 3/1982 | Davis et al. | 367/178 |
| 4,530,078 | 7/1985 | Lagakos et al. | 367/149 |
| 4,621,896 | 11/1986 | Lagakos et al. | 350/96.29 |
| 4,752,132 | 6/1988 | Paviath | 356/345 |
| 4,767,210 | 8/1988 | Kashyap | 356/345 |
| 4,799,202 | 1/1989 | Assard | 367/149 |
| 4,799,752 | 1/1989 | Carome | 350/96.15 |
| 4,893,930 | 1/1990 | Garrett et al. | 356/345 |
| 4,994,668 | 2/1991 | Lagakos et al. | 250/227.19 |
| 5,140,559 | 8/1992 | Fisher | 367/149 |
| 5,155,548 | 10/1992 | Denver et al. | 356/345 |
| 5,155,707 | 10/1992 | Fisher | 367/149 |
| 5,206,924 | 4/1993 | Kersey | 385/24 |

OTHER PUBLICATIONS

Yurek et al., Acoustic Response of Fiber Optic Hydrophones for Planar Array Applications, NRL Mem. Rpt. 6871, Dec. 1991.

Bucaro et al., High Frequency Response of Fiber-Optic Planar Acoustic Sensors, J. of Lgt. Tech., vol. 9, No. 9, pp. 1195–1199, Sep. 1991.

Lagakos et al., Planar Flexible Fiber-Optic Acoustic Sensors, J. of Lgt. Tech., vol. 8, No. 9, pp. 1298–1303, Sep. 1990.

Lagakos et al., Planar Flexible Fiber-Optic Interferometric Acoustic Sensor, Opt., Ltrs, vol. 13, No. 9, pp. 788–790, Sep. 1988.

McDearmon, G., Theoretical Analysis of a Push–Pull Fiber-Optic Hydrophone, J. of Lgt. Tech., vol. LT–5, No. 5, pp. 647–652, May 1987.

Lagakos et al., Frequency and Temperature Dependence of Elastic Moduli of Polymers, J. Appl. Phys., vol. 59, No. 12, pp. 4017–4031, Jun. 1986.

Olsson et al., Active Stabilization of a Michelson Interferometer by an Electro Optically Tuned Laser, Appl. Opt. vol. 19, No. 12, pp. 1897–1899, Jun. 1980.

Lagakas et al., Acoustic Sensitivity Predictions of Single-Mode Optical Fibers Using Brillouin Scattering, Appl. Opt. vol. 19, No. 21, pp. 3668–3670, Nov. 1980.

Budianski et al., Pressure Sensitivity of a Clad Optical Fiber, Appl. Opt., vol. 18, No. 24, pp. 4085–4088, Dec. 1979.

Lagakos et al., Pressure Desensitization of Optical Fibers, Appl. Opt. vol. 20, No. 15, pp. 2716–2720, Aug. 1981.

*Primary Examiner*—Samuel A. Turner
*Assistant Examiner*—Robert Kim
*Attorney, Agent, or Firm*—Thomas E. McDonnell; Charles J. Stockstill

[57] ABSTRACT

This invention is an optimized planar fiber optic sensor utilizing robust design having high acoustic sensitivity and reduced acceleration response over that found in the prior art. A continuous optical fiber sensing arm is wrapped around a plurality of mandrels to reduce acceleration effects. An optical fiber sensing arm is embedded in an epoxy material to effectively eliminate the effects of the acoustic medium on the reference arm. The sensing arm and reference arm, along with input and output couplers, are encapsulated within an elastomer, natural rubber or butyl rubber which is an active element that providing high acoustic sensitivity. The mandrels may be solid compliant mandrels, tubular cylindrical mandrels and combinations thereof.

20 Claims, 10 Drawing Sheets

5,825,489

MANDRELL BASED EMBEDDED PLANAR FIBER-OPTIC INTERFEROMETRIC ACOUSTIC SENSOR

BACKGROUND OF THE INVENTION

1. Field of the Invention

The present invention relates generally to fiber optic acoustic sensors and, more particularly, to embedded planar fiber-optic interferometric acoustic sensor.

2. Description of the Related Art

The design of acoustic-optic sensors is based upon the phase shift in light passing through a fiber when subjected to acoustic waves. Generally, an optical fiber is attached to an interferometric sensor which is comprised of an acoustically sensitive sensor fiber arm and an environmentally-shielded reference fiber arm. A laser beam transmitted along the optical fiber is split by an optical coupler and transmitted through both the sensor and reference arms. The difference in phase shift between the sensor and reference arms is related to the strength of the sensed acoustic field. These types of sensors are described in further detail in various patents, such as U.S. Pat. Nos. 4,162,397; 4,297,887; 4,363, 114 and 4,994,668.

Acoustic sensors are usually made of PZT (lead-zirconate-titanate) which cannot easily be constructed so as to conform to a particular shape called for by a specific application. In such a case, many smaller PZT's must be connected resulting in a sensor that is heavy for underwater application where weight is important. Further, the PZT's are subject to electromagnetic interference since their output is electrical and they are limited to very small sizes because the larger sizes are very fragile. PZT transducers also have an acoustic impedance that is different from that of water.

Acoustic sensors can also be formed utilizing $PVF_2$ (polyvinledene flouride) which can be formed to almost any shape and transducers formed from such material lack the weight associated with PZT transducers. However, since their output is electrical they are subject to electromagnetic interference. In addition, the electric signal from the $PVF_2$ transducer is small and amplification is needed at the "wet" end which is not desirable in many applications.

The planar sensor generally is a large area flexible acoustic sensor that is easily driven into flexible modes of vibration and generally exhibits large transduction effects in bending. In the planar design, the measurement of the phase modulation is accomplished by embedding a concentrically wound or snaked sensor fiber and a concentrically wound reference fiber of an acousto-optic interferometric sensor in a thick layer of material having a low bulk modulus. In the current technology, as set forth in U.S. Pat. No. 4,994,668, it has been found that even though the sensitivity of these fibers is high, it is not flat over a wide frequency range owing to acoustically induced acceleration effects and has a tendency to deteriorate over time due to water attack on the coating/coating and coating/glass bonding layers.

Because the phase shift which occurs within any length of fiber immersed in a liquid is small, the fibers are arranged in the planar design in either a coil or a spiral configuration. In a linear design, acoustic sensitivity is maximized when the sensor fiber is configured as a coil wound about a polymer mandrel such as teflon® or nylon®. In such an arrangement, the transmission mechanism is indirect. The acoustic field generates strains within the mandrel which changes its diameter and thus the fiber length, which, in turn, modulates the phase of the optical light.

Fiber optic planar sensors have been developed recently by forming a planar fiber spiral embedded in polyurethane. (See, Lagakos et al.,*Planar Flexible Fiber-Optic Acoustic Sensors*, J. of Lightwave Tech., Vol.8 No. 10, pp.1298–1303, Oct 1990.). Even though the sensitivity of these sensors is high, they are also sensitive to acceleration effects. In a superior planar optic design, the sensing fiber of a sensor is wrapped around very thin air-filled tubes resulting in a very high sensitivity (due to the high compliance) and very low acceleration sensitivity. These "air-backed" sensors, however, lack a certain degree of ruggedness, have a limited static pressure operating range, are somewhat difficult to fabricate thereby resulting in potentially high production costs, and can become acoustically reflective at the higher frequencies (loss of transparency), especially for large tube diameters.

None of the prior art in the acoustic sensor field provides a planar fiber optic sensor and system that has a high acoustic sensitivity and low acceleration response, is easy to fabricate, is transparent to the medium surrounding it, and is substantially unaffected by large operating depths.

SUMMARY OF THE INVENTION

The objective of the invention is to provide a planar fiber optic sensor having a high acoustic sensitivity and low acceleration response.

A second objective of this invention is to provide a planar fiber optic sensor that is robust, unaffected by large operating depths, easily fabricated and is very transparent to the medium surrounding it.

These and other objects are achieved by a sensor comprising a sensing fiber wrapped around a plurality of compliant plastic mandrels encapsulated in an elastomer material having a relatively low bulk modulus (such as polyurethane, natural rubber, or butyl rubber). The elastomer material is an active element of the sensor providing a higher acoustic sensitivity than found in the prior art. Placement of the plurality of fiber wrapped mandrels within the encapsulant may be in a variety of configurations (e.g., side-by-side, linearly, circularly) depending upon the intended application and space available.

DETAILED DESCRIPTION OF THE PREFERRED EMBODIMENT

This invention describes an improved fiber optic acoustic sensor of rugged construction and increased pressure sensitivity that can be configured to meet many varied installation and operational requirements. With reference to the drawings, like numerals representing like elements appear throughout the views.

The invention generally comprised of a light source or laser for producing an optical light beam which is applied to an acoustical optic detector; either a Mach-Zehnder-type, or a Michelson-type interferometric sensor, to detect changes in acoustic pressure; and a means for displaying the detected change in acoustic pressure. An exemplary interferometric acoustic detector or mandrel mounted sensor is responsive to light from the light source for producing at its output an optical signal produced by the acoustic field being sensed by the interferometric sensor. When the acoustic field is applied to an interferometric sensor having a fiber snugly wrapped around a compliant mandrel, the mandrel diameter is modulated by the applied field, which, in turn, modulates the fiber length.

Figure 1A:
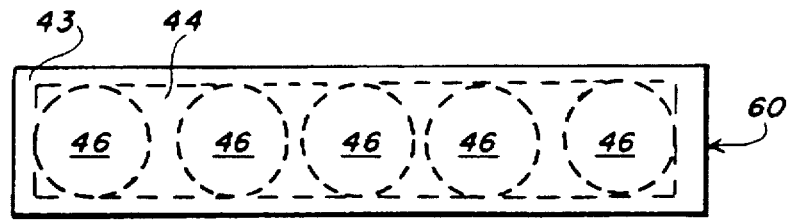
FIG. 1A is a schematic showing the top view of a mandrel based embedded planar fiber-optic interferometer acoustic sensor of the invention with the mandrels mounted adjacent and couplers located outside of a mandrel.
Figure 1:
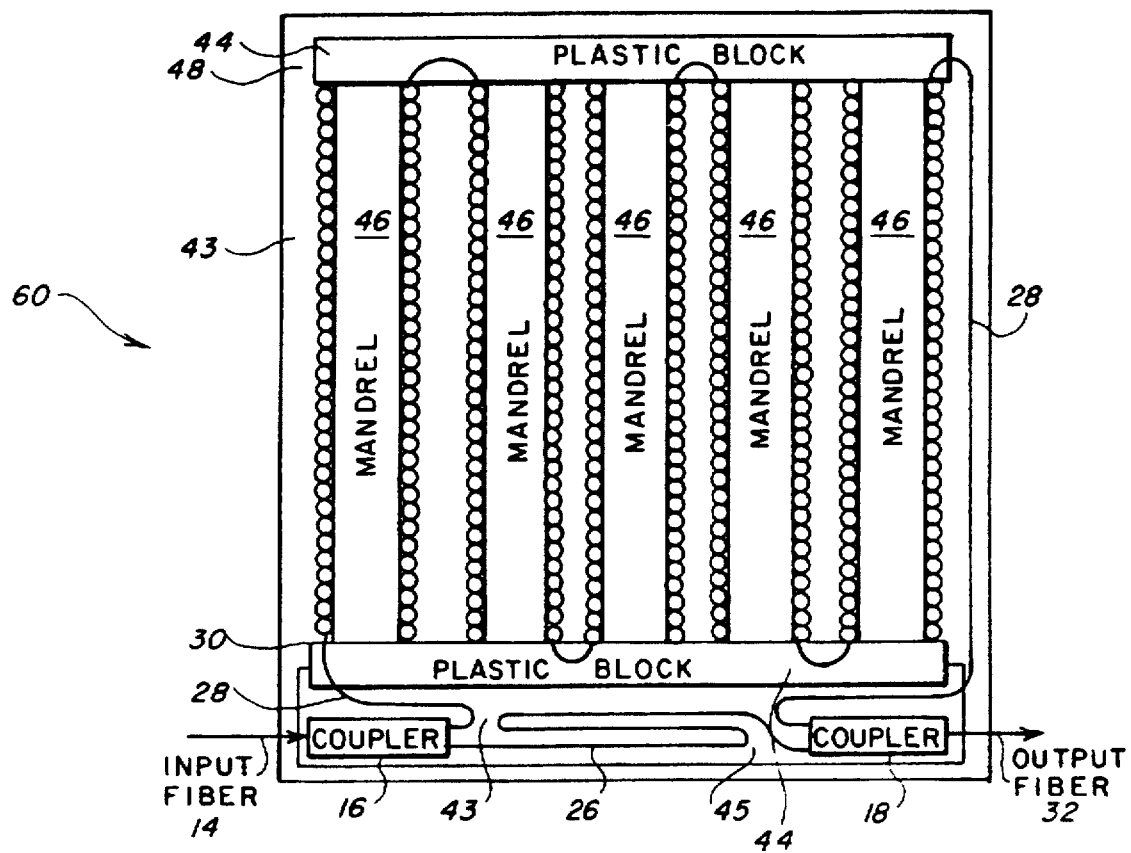
FIG. 1 is a schematic of a mandrel based embedded planar fiber-optic interferometric acoustic sensor of the invention with the mandrels mounted adjacent and couplers located outside of a mandrel.

In the preferred embodiment of the sensor, the mandrel based planar embedded fiber-optic sensor 60, shown in FIG. 1, may be utilized in either a Mach-Zehnder-type or Michelson-type interferometer, however, the preferred interferometer is a Michelson-type. (A top view of FIG. 1 is shown in FIG. 1A.) A plurality of optical fiber wrapped mandrels 46 (in this embodiment five) are attached at the upper and lower ends 48 and 38, respectively, with an adhesive (preferably epoxy, such as A178-B manufactured by B. F. Goodyear of Akron, Ohio), to a plastic bar 44 (preferably an acrylic, such as Lucide® manufactured by E. I Dupont DeNemours & Co. of Wilmington, Del.). The mandrels nominally have an outer diameter of 0.5 inches. However, other outside dimensions may be utilized. Although the preferred mandrel configuration has solid compliant mandrels; cylindrical tubular mandrels, and combinations of solid compliant mandrels and cylindrical tubular mandrels may be utilized, as well as air-backed mandrels or other similar mandrels known to the art.

The optical fiber is sequentially wound around the mandrels 46 to form the sensing fiber arm 28 of the interferometer, nominally, 170 turns around each of the five mandrels 46. It is preferred that the fibers wrapped around each of the individual mandrels 46 be connected together optically in series so as to form one continuous sensing fiber arm 28. However, nothing would preclude connecting the sensing fiber arm 28 so as to form a plurality of parallel sensing fiber arms 28 or combinations of parallel and continuous sensing fiber arms 28.

The optical fiber forming the sensing fiber arm 28 is snugly wrapped (e.g., the fiber is wrapped onto the mandrels 46 while it is unwound from the spool without any extra tension other than the friction generated by the pull of the fiber as it is removed from the spool) onto the mandrels in a single layer. To increase the sensitivity of the sensor 60, the fiber forming the sensing fiber arm 28 may be wrapped in a plurality of layers. However, satisfactory performance may be also be obtained from a sensing fiber arm 28 that is loosely wrapped (wrapped so as not to touch the mandrel 46). With the single layer wrap on each mandrel 46 of the experimental sensor, the sensing fiber arm 28 is approximately 28 m in length, if two layers approximately 50 m, with three layers approximately 75 m, and each successive layer increases the length by the same proportional amount.

A preferred fiber, for the sensing and reference fiber arms 28 and 26, respectively, (e.g., Accutether 140, manufactured by AT&T of Atlanta, Ga.) is as described in the paper by Lagakos et al., *Acoustic sensitivity predications of single-mode optical fibers using Brillouin scattering*, Applied Optics, Vol. 19 No. 21, pp. 3668–3670, 1 Nov. 1980; and U.S. Pat. Nos. 4,944,668 and 4,979,798, which are hereby incorporated by reference. However, any optical fiber known to the art may be used. Lagakas et al. teaches a high-numerical-aperture (0.17) single mode fiber with an 80 μm outer diameter that has been hermetically sealed by applying a layer of amorphous carbon to a core optical fiber while it is being drawn and then coating the core fiber with a 80 μm to 220 μm buffer of silicone (the optimum being 100 μm). The fiber configuration of Lagakas et al. is preferred in this invention. Such a fiber has an additional 600 μm o.d. coating of polyester (Hytrel® 7246, manufactured by DuPont Corp. of Wilmington, Del.), making a total diameter of 1 mm. (Thicker or thinner fibers may be utilized for both the sensor and reference fibers arms 28 and 26 depending on the intended operational use and construction constraints.) In the sensing arm 28, good bonding between the different layers of material composing the fiber is essential to properly transfer the acoustic pressure from the outer layers of the fiber to the core fiber.

Figure 2:
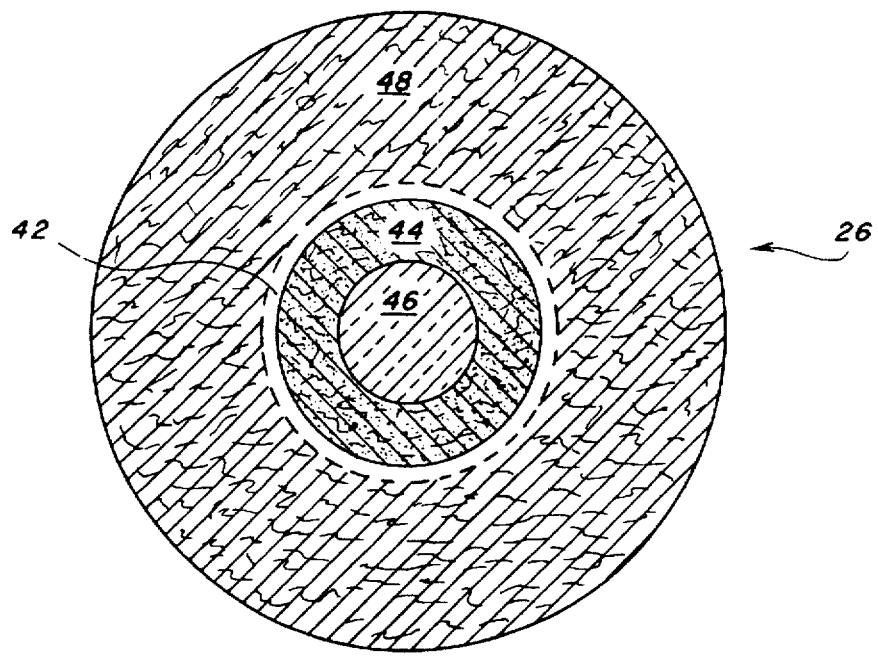
FIG. 2 is a schematic of a typical reference fiber of the invention with a gap between the nylon coating and the silicon coating.

The reference fiber arm 26 optical fiber differs from the optical fiber forming the sensing fiber arm 28. A typical cross-section of a reference fiber arm 26 is shown in FIG. 2. An additional 1 mm outside diameter coating of Nylon® 48 (preferably Rimlast®, manufacturer's number GF 12 made by Petrarch Corp. of Bristol, Pa.) is placed on a fiber core 46. This additional coating has a 30 μm to 50 μm thick gap 42 (the optimum being 40 μm) between the silicon coating 44 surrounding the fiber core 46 and the nylon 48. Such a fiber 26 with the gap 42 between the coatings 44 and 48 has a very low acoustic sensitivity because the gap 42 does not allow transferring of axial stresses, which are dominant, to the fiber core 46. The reference fiber arm 26 is of a short length (nominally, from having minimal acoustic sensitivity and may be located within the inner area of the mandrel.

However, the length of the reference fiber arm 26 is not critical, the nominal length typically may vary from 15 mm to 100 mm.

Figure 3:
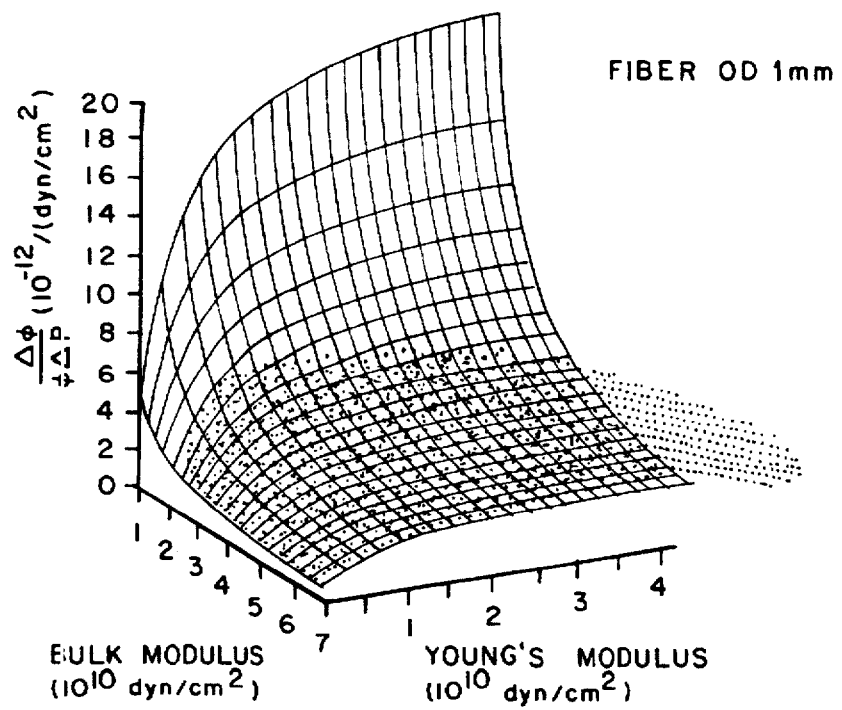
FIG. 3 is a graph of the acoustic sensitivity versus bulk and Young's moduli of the outer coating of a typical single-mode fiber of the invention.

The pressure sensitivity of the optical phase of the sensing fiber arm 28 is defined as $\Delta\phi/\phi\Delta P$ where $\Delta\phi$ is the shift in the phase $\phi$ due to pressure change $\Delta P$. If the given pressure change $\Delta P$ results in a fiber core axial strain $\epsilon_z$ and a radial strain $\epsilon_r$, then it can be shown be shown that $$\frac{\Delta\phi}{\phi} = \epsilon_z - \frac{n^2}{2}[(P_{11}+P_{12})\epsilon_r + P_{12}\epsilon_z] \quad (1)$$

Where $P_{11}$ and $P_{12}$ are the elasto-optic coefficients of the core and n is its refractive index. See, Lagakos et al., *Pressure desensitization of optical fibers*, Applied Optics, Vol. 20 No. 15, pp. 2716–2720, August 1981. Generally, the acoustic sensitivity is a very strong function of the elastic moduli of the outer hard polymeric coating of the sensing fiber arm 28. High sensitivity can be achieved with a coating of low bulk modulus and high Young's modulus materials, as can be seen in FIG. 3 for a typical fiber. The bulk modulus determines the "maximum" fiber dimensional changes, while the Young's modulus governs the fraction of these changes, or strains, which can couple to the fiber core.

Again referring to FIG. 1, input and output fiber couplers, 16 and 18, respectively, are connected to the input and output optical fibers 14 and 22, respectively, and the input end and output end, respectively, of the sensor 28 and reference 26 arms are embedded an epoxy material (preferably Chockfast Orange®, manufactured by ITW Philadelphia Resins of Montgomeryville, Pa.) having a high bulk modulus, K, much greater than the bulk modulus of the encapsulant 43, i.e., a bulk modulus of from $1\times10^{10}$ to $10\times10^{10}$ dynes/cm², to form a coupler assembly 45. The coupler assembly 45 is attached to either plastic bar 44 with an epoxy adhesive. However, any adhesive which is well known to those individuals practicing in the art may be utilized.

Figure 4:
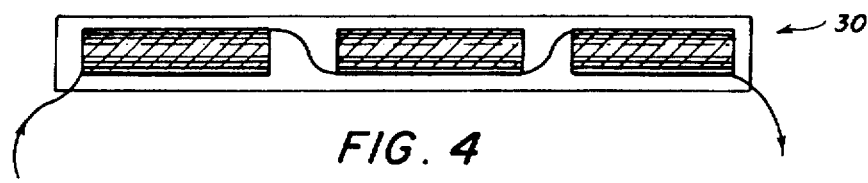
FIG. 4 is a schematic of a mandrel based embedded planar fiber-optic interferometric sensor of the invention with the mandrels mounted in-line.
Figure 5:
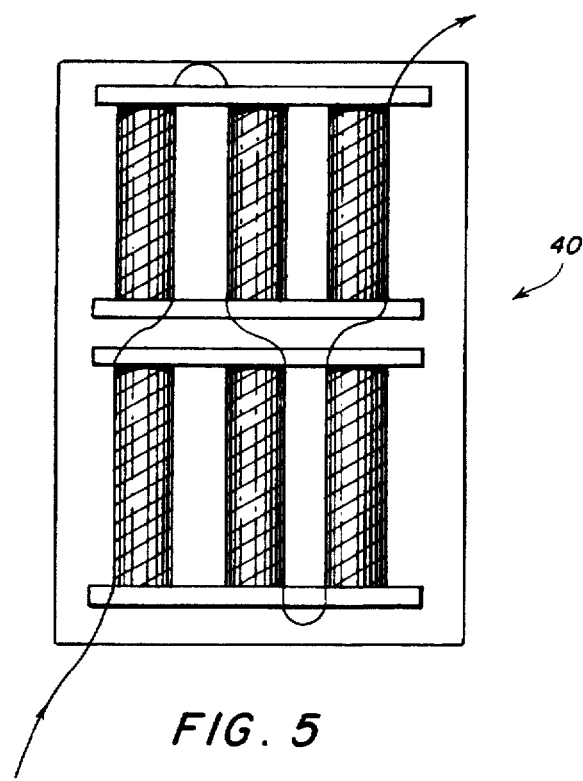
FIG. 5 is a schematic of a mandrel based embedded planar fiber-optic interferometric sensor of the invention with the mandrels stacked.
Figure 6:
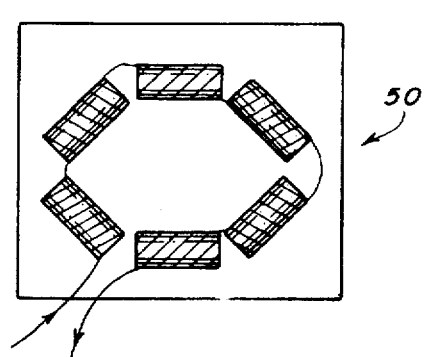
FIG. 6 is a schematic of a mandrel based embedded planar fiber-optic interferometric sensor of the invention with mandrels circular mounted.
Figure 7:
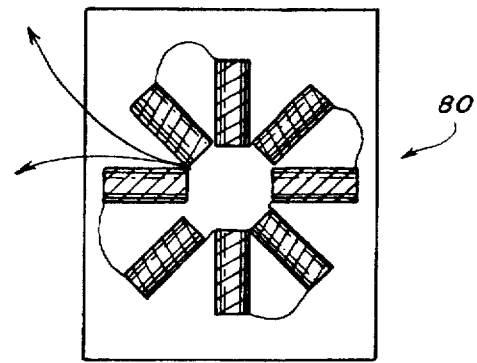
FIG. 7 is a schematic of a mandrel based embedded planar fiber-optic interferometric sensor of the invention with mandrels radially mounted.

The mandrels 46 with the continuous sensing fiber arm 28 wound around them, the coupler assembly 45 containing the input and output couplers 14 and 18 and the reference fiber arm 26 are embedded in an encapsulant 43 to form a mandrel based embedded planar fiber-optic interferometric acoustic sensor 60. The encapsulant material completely fills all voids between the mandrels 46 and coupler assembly with the mandrels 46 mounted in a side-by-side configuration. A typical block formed by the encapsulant 43 will measure 4 inches by 4 inches by 1 inch in size. Other sensor configurations such as, in-line 30, FIG. 4, stacked 40, FIG. 5, circular 50, FIG. 6, radial 80, FIG. 7. Any numbers of mandrels, types of mandrels (such as, cylindrical, solid, air-backed),: and sizes of blocks may be utilized depending upon the proposed use and sensitivities desired.

A preferred encapsulant 43 is the elastomer polyurethane, such as, Uralite 3140 manufactured by Hexcel Corp. of Chatsworth, Calif. or PR 1592 manufactured by Products Research & Chemicals Corp. of Glendale, Calif. Polyurethane is castable, thereby making the sensor construction easy and cost effective. Its acoustic impedance matches closely to that of water making the sensor acoustically transparent. Polyurethane has a density similar to that of water giving the possibility of a totally buoyant sensor. The bulk modulus, K, of polyurethane is relatively low (K=2.69× $10^{10}$ dynes/cm² for a frequency f=1 MHz) resulting in high sensitivity, while its Young's modulus, E, is not very low (E=0.794×$10^{10}$ dynes/cm² for a frequency f=1 kHz), thus with relatively low encapsulant thickness, the sensitivity limit can be approached. Using the above parameters, the acoustic sensitivity of a 4"×4"×1" sensor is $$\Delta\phi/\phi\Delta p = -318 \text{ dB re } 1/\mu Pa. \quad (2)$$

The elastic moduli of the encapsulant 43 plays a dominant role in determining the acoustic sensitivity of the sensor. Encapsulant, as a minimum should totally encapsulate the mandrels and assembly. Especially when using a relatively thick (1 in.) encapsulant 43, as in the preferred embodiment, the elastic moduli of the encapsulant 43 determines the acoustic sensitivity, while the elastic moduli of the fiber coating plays a minimum role. The thickness, optimally, should exceed a three-to-one ratio the diameter of the mandrel to fully realize the increased acoustic sensitivity provided by the encapsulant. The preferred thickness ratio of encapsulant-to-mandrel diameter ratio would be an eight-to-one ratio. At ratios of around one-to-one, the sensitivity is driven by the stiffness of the mandrel, not the desired trait of having the sensitivity driven by the stiffness of the encapsulant. Although an elastomer is the preferred encapsulant material, any other material, such as natural or butyl rubber, having a stiffness less than the stiffness of the mandrels may be utilized as an encapsulant. The Young's modulus of the mandrels should be greater by at least a factor of two to that of the encapsulant 43 to prevent any decrease in sensitivity. Preferably, the ratio of Young's modulus should exceed five, with a factor of ten or greater being optimal. In any event, the stiffness of the encapsulant 43 should, as a minimum, be such that it can withstand the ambient conditions into which it is introduced.

In other fiber optic acoustic sensors having mandrels embedded in an encapsulant, the encapsulant acts as a sealer, whereas in the embodiment described herein the encapsulant is an active element in the determination of the sensitivity of the device. In effect, the encapsulant drives the sensitivity of the device rather than the optical fiber wrapped mandrel.

Table 1 gives the induced fiber strain as a function of sensitivity for three static pressure levels. For long term operation, the strain in a curved fiber should be kept less than

TABLE 1

| $\Delta\phi/\phi\Delta p$ dB re 1/µ Pa | Fiber Strain | | |
|---|---|---|---|
| | 1000 psi | 2000 psi | 10,000 psi |
| −330 | 0.022 | 0.044 | 0.22 |
| −320 | 0.067 | 0.13 | 0.67 |
| −310 | 0.22 | 0.44 | 2.2 |
| −300 | 0.69 | 1.38 | 6.7 |
| −290 | 2.2 | 4.4 | 22.0 |
| −280 | 6.9 | 13.8 | 67.0 |

1% (preferably lower than 0.2%), which for 10,000 psi static pressure constrains the pressure sensitivity to less than −315 dB re 1/µ Pa. This limit is close to the −318 db re 1/µ Pa sensitivity of an embedded sensor, which is adequate for many practical fiber optic sensors.

The sensitivity of the sensor element is frequency independent over the band and the relative optical change per unit of applied acoustic pressure is $$\frac{\Delta\phi}{\phi\Delta P} = \frac{1.26\times10^{11}}{\left(\frac{dyn}{cm^2}\right)} = -318 dB re \frac{1}{\mu} Pa \quad (3)$$

The acoustic sensitivity of a fiber wrapped around a mandrel and embedded in an encapsulant is a function of the thickness and the elastic moduli of the mandrel and the encapsulant. For a mandrel with a small diameter (for example, 2 mm to 3 mm) embedded in a thick (for example, one inch) encapsulant, the acoustic sensitivity is governed by the bulk modulus of the encapsulant, i.e., a low bulk modulus results in high acoustic sensitivity. For a thick mandrel (for example, 5 mm to 10 mm) embedded in a thin layer of encapsulant (for example, one-half inch), the bulk modulus of the mandrel governs the sensor sensitivity. As the mandrel bulk modulus decreases the modulation increases, resulting in high sensitivity, the sensitivity of the sensor being proportional to the inverse of the bulk modulus.

Figure 8:
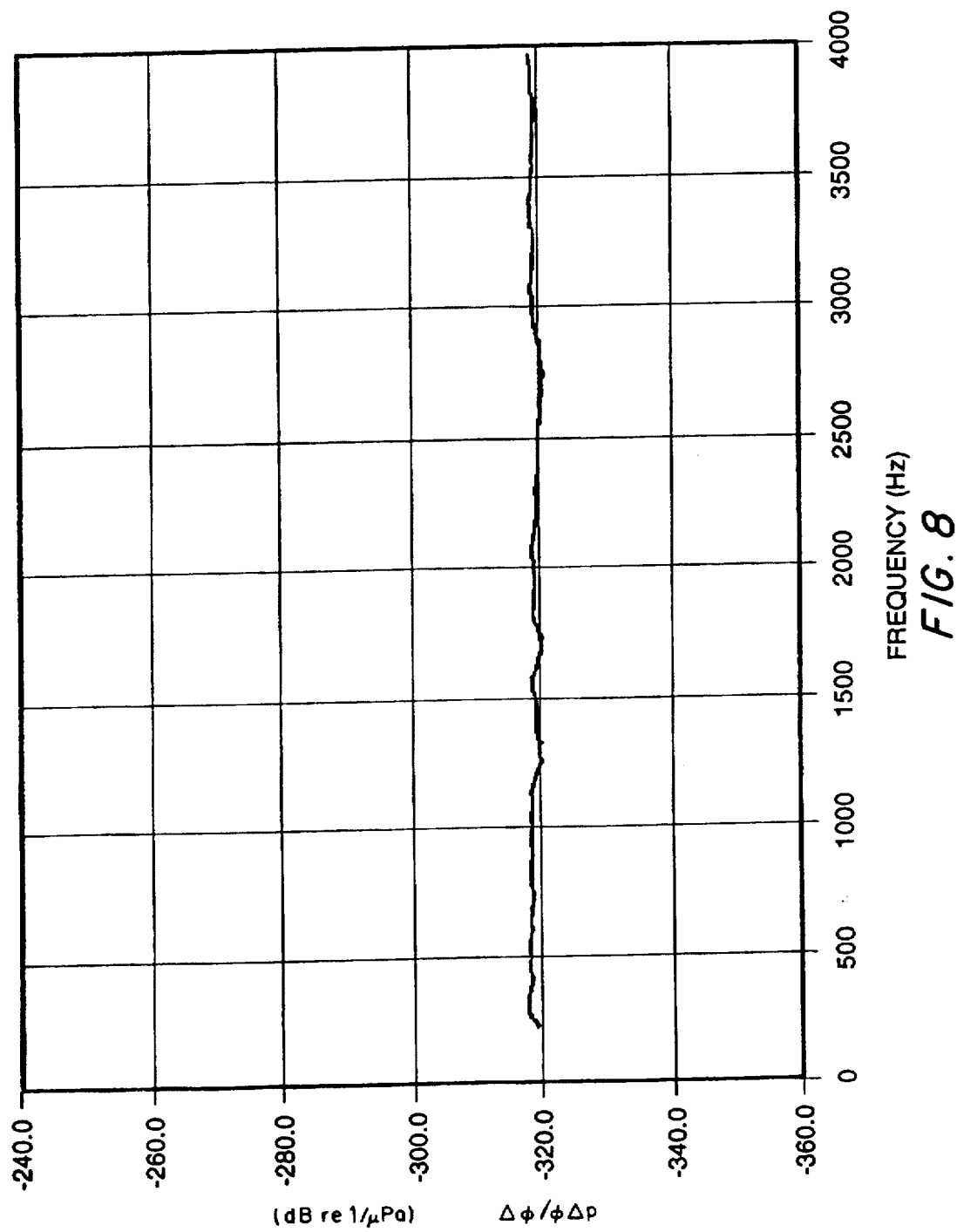
FIG. 8 is a graph of the normalized acoustic response of an acoustic sensor of the invention in the frequency range of 0.2–2.5 kHz whose mandrels have a three fiber wrap.
Figure 9:
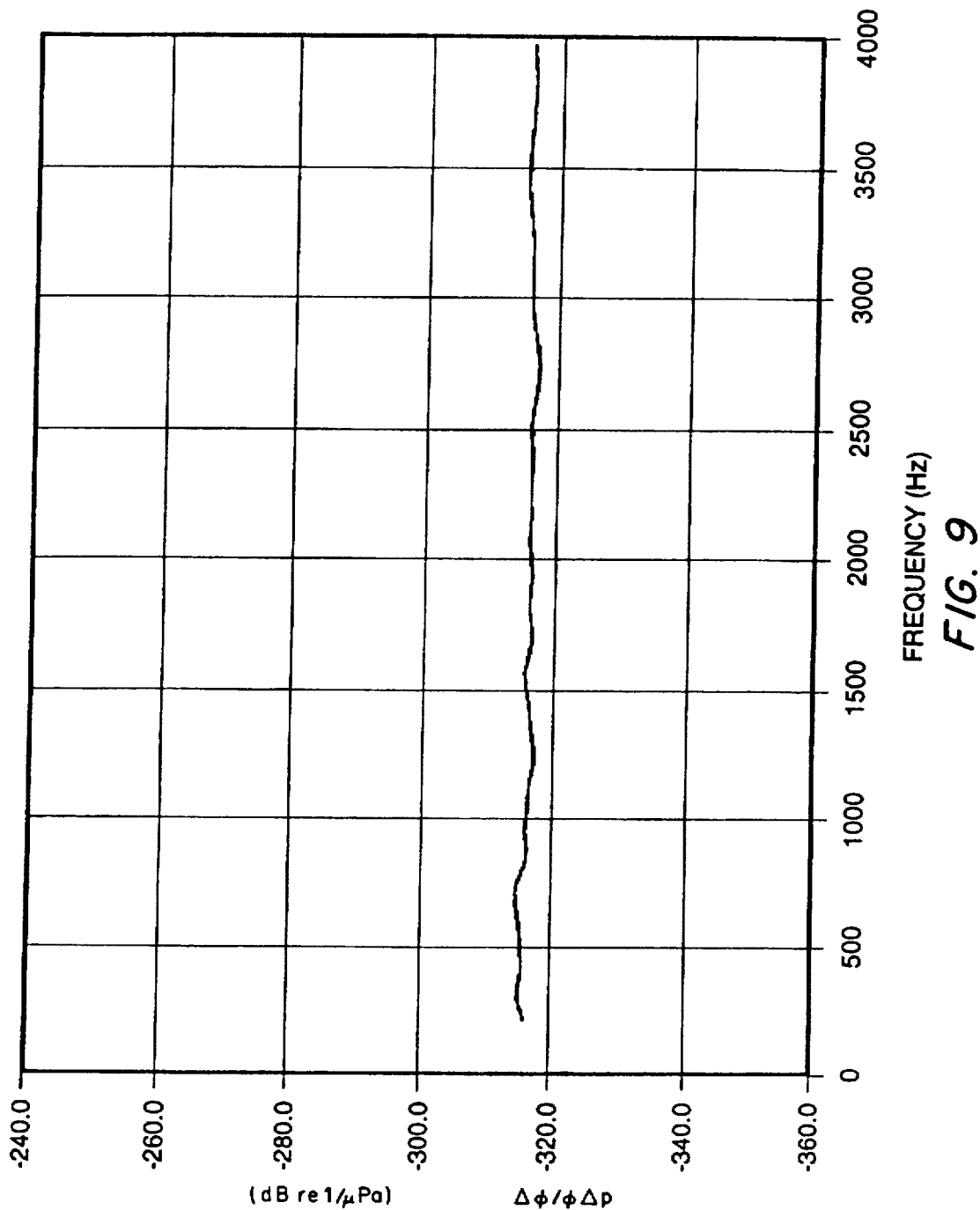
FIG. 9 is a graph of the normalized acoustic response of an acoustic sensor of the invention in the frequency range of 0.2–2.5 kHz whose mandrels have a two fiber wrap.
Figure 10:
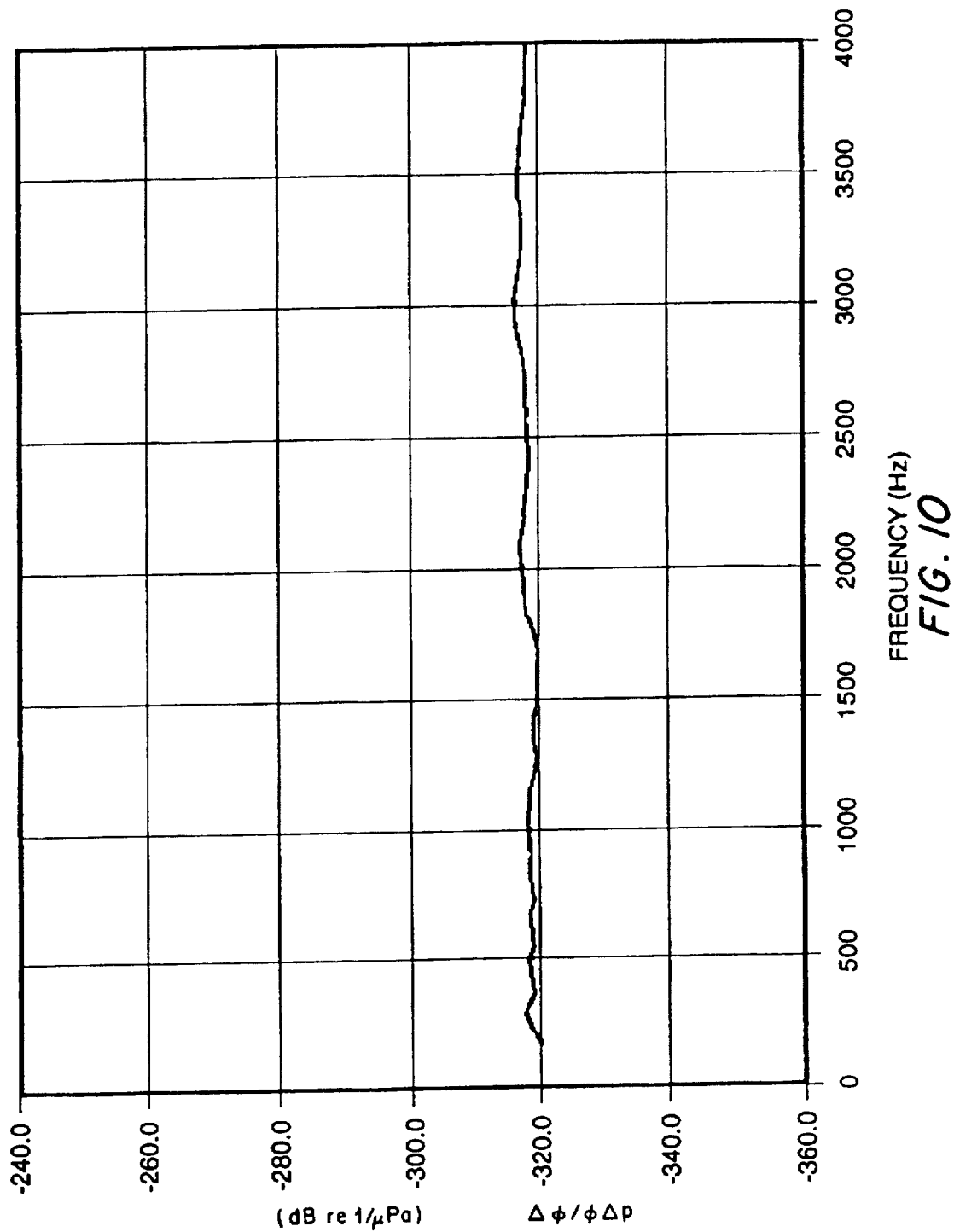
FIG. 10 is a graph of the normalized acoustic response of an acoustic sensor of the invention in the frequency range of 0.2–2.5 kHz whose mandrels have a one fiber wrap.
Figure 11:
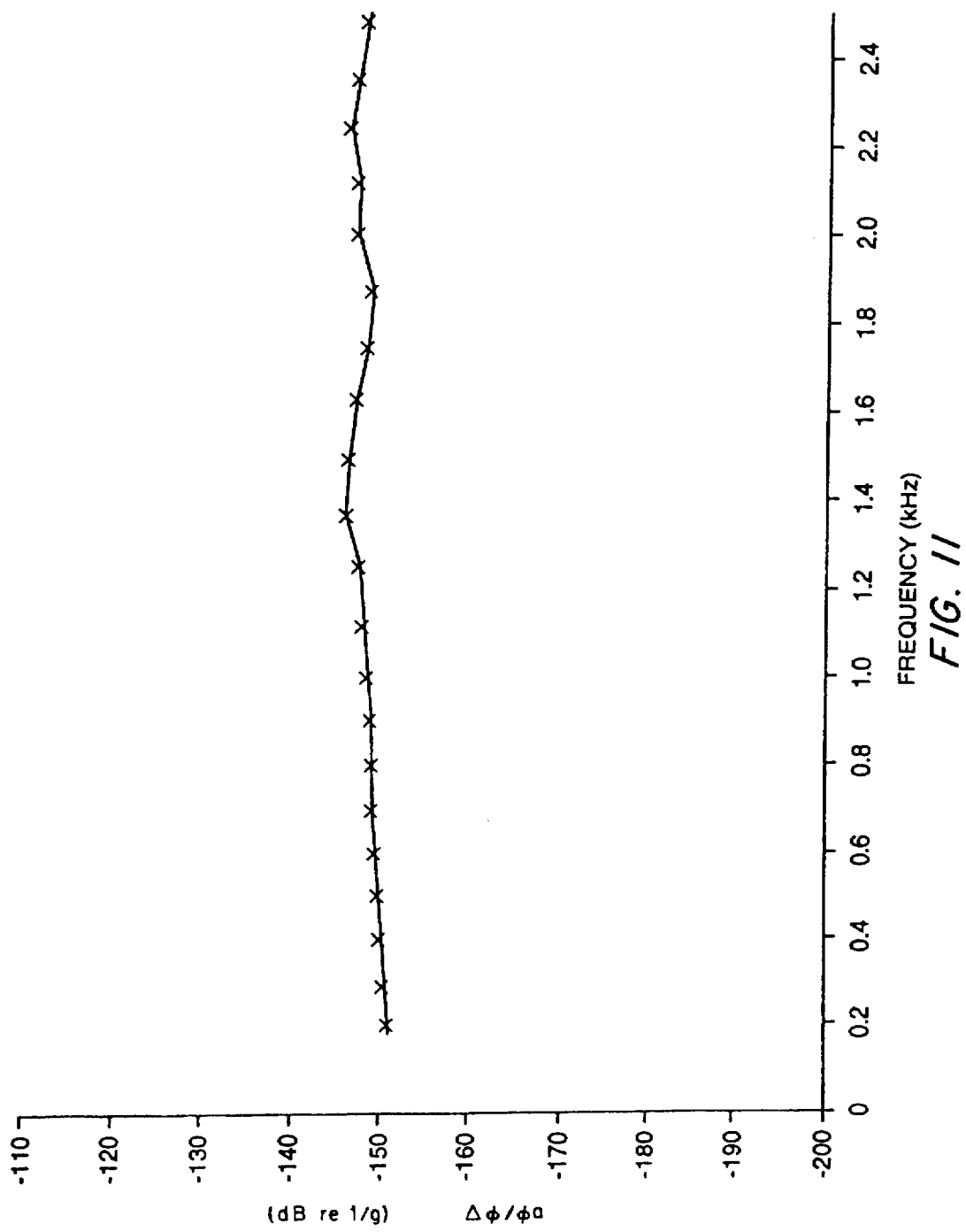
FIG. 11 is a graph of the normalized acceleration response of conventional spiral sensors in the frequency range of 0.2–2.5 kHz.

The normalized acoustic response $\Delta\phi/\phi\Delta p$ of a sensor having mandrels with one, two or three fiber wraps is as shown in FIGS. 8, 9 and 10. It is to be noted that the response curves are relatively flat at frequencies of from 0.2–2.6 kHz. The acceleration response shown in FIG. 11 is, in all cases, at least 15 dB lower than the acceleration response for currently utilized spiral sensors. Since the relative sensitivity has been normalized to the fiber length, the sensitivity of the sensor with three wraps is 3 times higher than that of one wrap. This means that significant sensitivity can be achieved by more fiber wraps, however, theoretically, there is a point reached where the sensitivity will no longer increase proportionally to the number of wraps.

Figure 12:
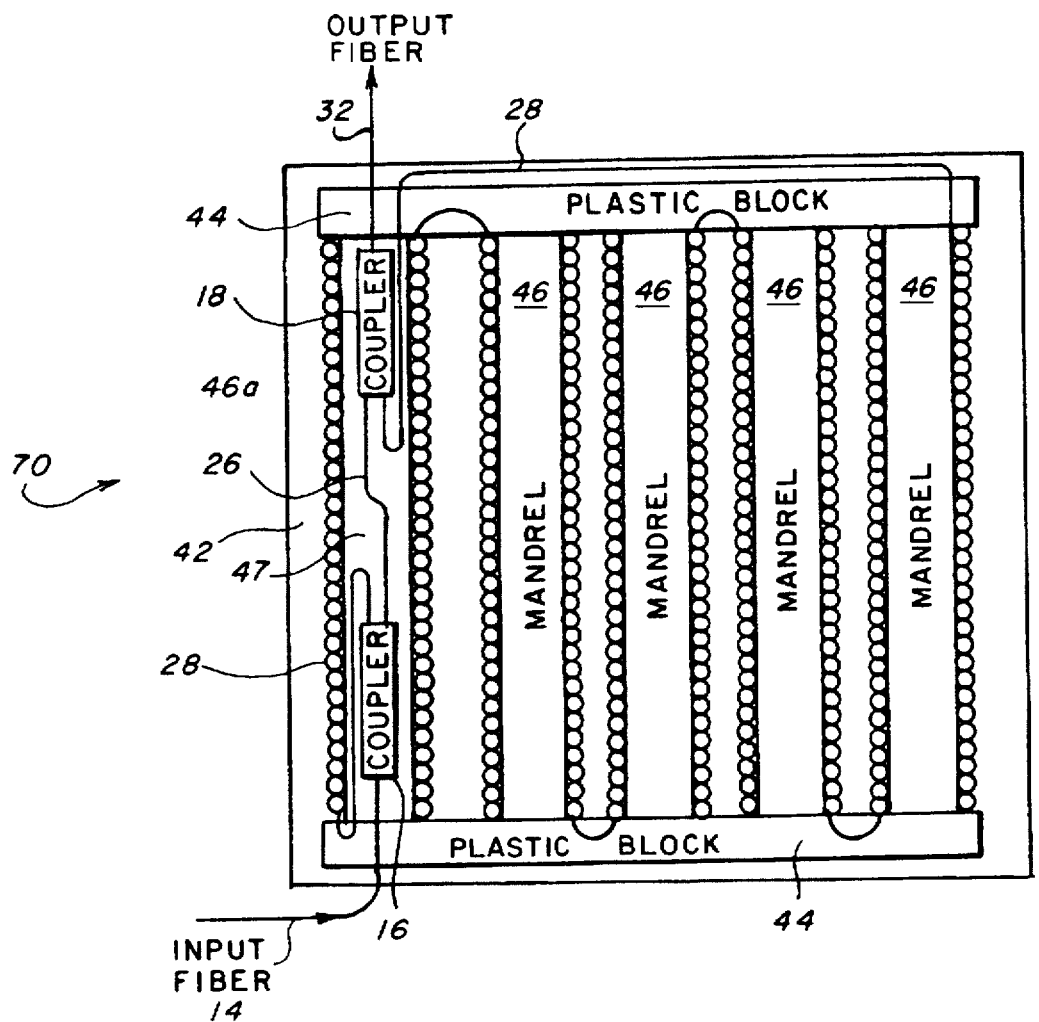
FIG. 12 is a schematic of a mandrel based embedded planar fiber-optic interferometric acoustic sensor of the invention with the mandrels mounted adjacent with the couplers located within at least one mandrel.

In another preferred embodiment of the acoustic sensor 70, see FIG. 12, at least one of the mandrels 46 is a tubular cylindrical mandrel 46a. Within the tubular section of this mandrel 46a, input and output couplers 16 and 18, along with the reference fiber arm, are placed inside and the tubular is filled with the epoxy material 47. The operation of this embodiment will be the same as previously described. This embodiment is useful where the space allowable for the sensor is critical.

Figure 13:
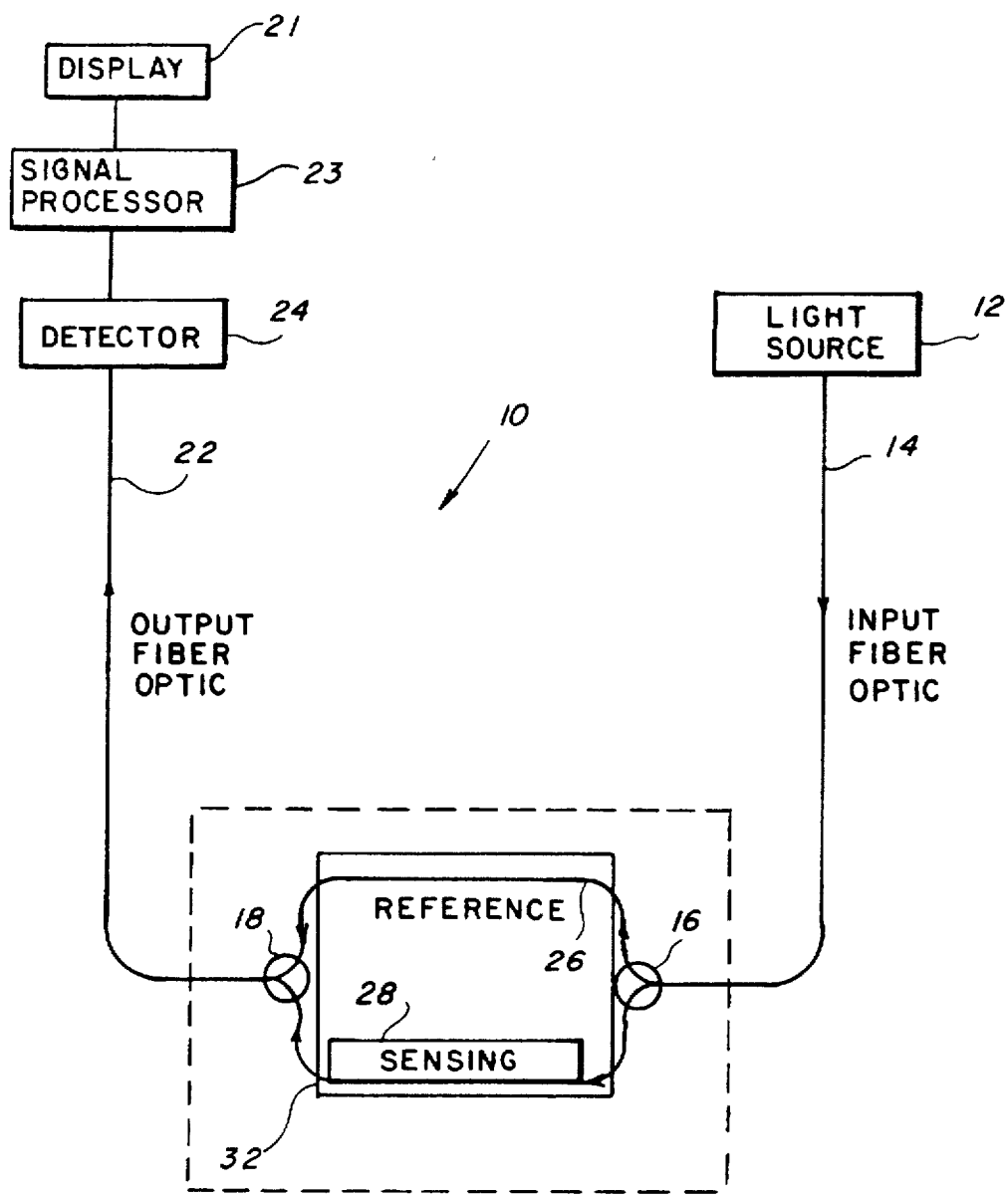
FIG. 13 is a schematic of a typical interferometric fiber optic sensor system utilizing a Mach-Zehnder-type interferometer.

In a preferred embodiment of a sensor system utilizing the planar fiber-optic interferometric acoustic sensor 32, shown in FIG. 13, a Mach-Zehnder-type interferometric fiber optic acoustic sensor system 10, the optical light beam from the laser light source 12 applied through a fiber optic cable 14 to the interferometer or interferometric acoustic sensor 32. The optical light beam is split into two parts or portions by an optical coupler 16 at the input of the sensor. A portion of the optical light beam is propagated through a reference fiber arm 26 (commonly referred to as the reference fiber) and another portion being propagated through the sensing fiber arm 28 (commonly referred to as the sensing fiber) which is exposed to the acoustic field or medium. The difference in phase between the sensing and reference arms, 28 and 26, respectively, is proportional to the acoustic pressure of the medium sensed by the interferometer 32. The two parts of the optical beam are recombined to develop an optical signal which contains an interference pattern (not shown) in an output optical coupler 18 and the recombined beam (optical signal) of the interferometer 32 passes (or propagates) through the fiber 22 to a photodetector 24.

The photodetector 24 is responsive to the optical signal from the interferometric acoustic sensor 32 and converts the optical signal into a photocurrent signal having a peak-to-peak amplitude proportional to the amplitude of the interference pattern which is applied to a signal processor. A signal processor 23 converts the photocurrent signal into a form for display upon an audio, visual or magnetic display means 21.

Figure 14:
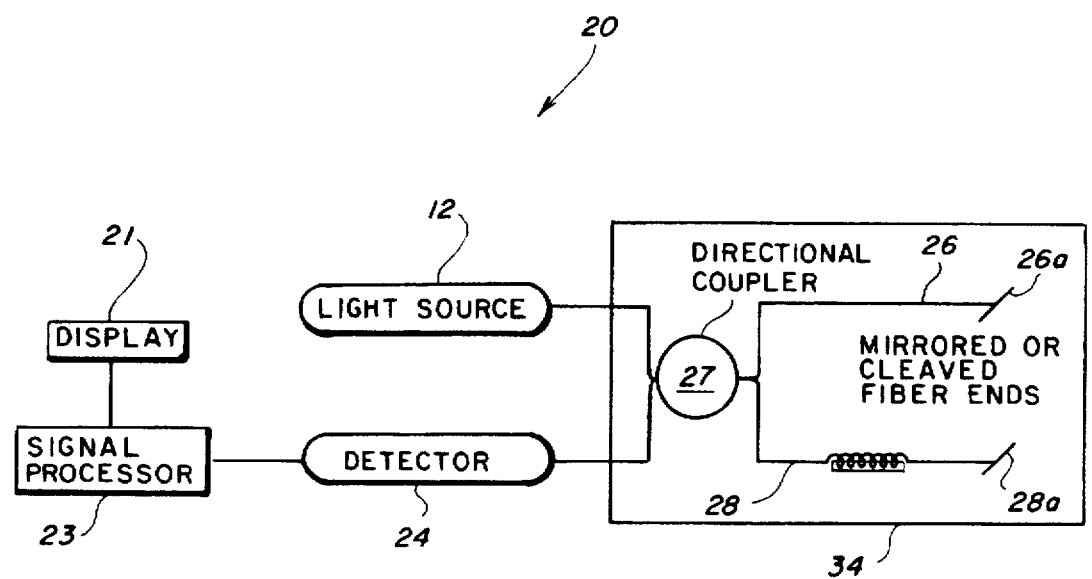
FIG. 14 is a schematic of a typical interferometric fiber optic sensor system utilizing a Michelson-type interferometer.

In another preferred embodiment 20 of the sensor system utilizing the planar fiber-optic interferometric acoustic sensor 34, shown in FIG. 14, the interferometric acoustic sensor 34 utilizes a Michelson-type interferometric configuration. Other than the difference in interferometric acoustic sensor 34 type, the system operation is basically the same as previously described for the Mach-Zehnder-type interferometric fiber optic acoustic sensor system 10.

In the Michelson-type interferometric configuration an optical light beam from a light source 12 pass through a directional coupler 27 which separated the light beam into two portions. A first portion is propagated through a reference arm 26 and the second portion through a sensing arm 28. The reference arm 26 and the sensing arm 28 are of unequal length so as to provide an optical path difference. A mirror is deposited at the free end or a cleaven end 26a and 28 of the reference fiber arm 26 and sensing fiber arm 28 reflecting the optical light beam from the light source 12 back through the respective fiber. The technique of double passage of the optical light beam through the fibers utilized in the Michelson-type interferometer increases the sensitivity of the sensor 34 by a factor of two.

The reflected light beams from the reference and sensing arms 26 and 28 are recoupled into an optical signal by the directional coupler 27 and the optical signal is applied to a detector 24. As in the Mach-Zehnder-type interferometer 32, the difference in phase shift of the optical signal between the reference and sensing arm 26 and 28, respectively, is proportional to the acoustic pressure of the medium that is applied to the sensing arm 28.

The mirrors 26a and 28a terminating the reference and sensing arms 26 and 28 may be combined with a Faraday rotator mirror (FRM) (not shown). (SEE, U.S. Pat. No. 5,206,924, Cols. 4 & 5 and FIG. 1, for a description of the operation of a FRM assembly.) Utilizing such a termination combination of mirrors and FRM (not shown), there is a 45° rotation of the phase angle as the optical light transits in each direction in the reference arm and sensing arm 26 and 28 thereby correcting the optical light beam for polarization fade and effect.

When using an unbalanced interferometer (e.g., the reference fiber 26, 15 mm to 100 mm in length, is shorter than the sensing fiber 28), of either the Mach-Zehnder- or Michelson-type, the light source 12 may not be a rather poor coherent solid state laser but must be a highly coherent light source such as a Nd:YAG laser or, preferably, a solid state pumped Nd:YAG single mode laser. With a highly coherent light source, the reference fiber 26 can be short or acoustically desensitized. Using an acoustically desensitized fiber, the interferometric acoustic sensor 32 can be buoyant and acoustically transparent in water, which is highly desirable for underwater sensing operations. The length of the desensitized fibers can be as short as 5 cm, however, 15 cm is the typical length for a mandrel sensor so as to avoid axial resonances in the frequency band of interest. Even though a interferometric acoustic sensor 32 with a short reference fiber 26 having a high sensitivity can be made easily, a desire to further reduce environmental noise may necessitate the use of a balanced sensor.

The fiber sensors are totally dielectric at the "wet" end and, thus are immune to electromagnetic interference. Therefore, they can operate in hostile environments such as high electric fields, chemically corrosive locations, and explosive environments. Thereby, a safety of operation which cannot be afforded by PZT transducers or $PVF_2$ sensors is present. Moreover, fiber sensors can be controlled remotely, that is the electronics (light source, detector, and signal processor) can be remotely located a considerable distance away from the sensing location.

Embedded fiber optic sensors have density and acoustic impedance similar to that of water. This is desirable for underwater applications for minimizing weight and sound scattering. Embedded fiber optic sensors can be shaped easily and can cover a large area. This is highly desirable when large surfaces, like the bottom of the sea, must be covered. Further, the acoustic sensitivity of the embedded sensor is high and is frequency independent. The reason for the high sensitivity is the effective utilization of a low bulk modulus elastomeric encapsulant. The acoustic sensitivity is frequency independent because the acceleration sensitivity has been minimized by the presence of the mandrels. However, if the thickness of the fiber is decreased to approximately 150 microns in diameter, the sensitivity of the embedded fiber will be driven by the mandrel rather than the characteristics of the encapsulant. Utilizing the techniques for sensor designed set forth in this specification, the sensor is flexible, conformal, buoyant, and acoustically transparent to the surrounding medium and has a high acoustic sensitivity and immunity to electromagnetic interference. Such characteristics make it is usable in a variety of applications.

Although air-backed sensors may be used in this invention, the solid mandrel type sensor described herein has less critical mechanical tolerances (therefore it is less expensive to manufacture) and is more robust. Further, contrary to air-backed sensors, the mandrel-type embedded fiber optic sensors can be acoustically transparent and buoyant in water and their ruggedness make them capable of operating at greater depths without damage.

Numerous modifications and adaptations of the present invention will be apparent to those skilled in the art. Thus, it is intended by the following claims to cover all such modifications and adaptations which will fall within the spirit and scope of the invention.

What is claimed is:

1. A fiber-optic interferometric acoustic sensor comprising:

a plurality of mandrels;

an optical fiber of a predetermined length wrapped around each mandrel of said plurality of mandrels so as to form a continuous optical fiber sensing arm;

an optical fiber of a predetermined length forming a reference arm not wrapped around said mandrels;

an input and an output optical coupler coupled to said sensing and reference arms;

a material wherein said input and output couplers, and said reference arm are embedded to form a coupler assembly; and an encapsulant material having a Young's modulus less than the Young's modulus of each of the plurality of mandrels, and said optical fiber wrapped mandrels and said coupler assembly encapsulated by said encapsulant material.

2. The acoustic sensor of claim 1 wherein said mandrels are selected from a group consisting of solid mandrels, tubular mandrels and combinations of solid and tubular mandrels.

3. The acoustic sensor of claim 1 wherein said encapsulant is selected from a group consisting of an polyeurethane, natural rubber and butyl rubber.

4. The acoustic sensor of claim 1 wherein at least one of said plurality of mandrels is a tubular mandrel and said coupler assembly is disposed within said tubular mandrel.

5. The acoustic sensor of claim 1 wherein said material within which said input and output couplers and said coupler assembly are imbedded has a bulk modulus of from $1 \times 10^{10}$ dynes/cm$^2$ to $10 \times 10^{10}$ dynes/cm$^2$.

6. A fiber-optic interferometric acoustic sensor comprising:

an input and an output fiber optic cable;

a plurality of mandrels of a predetermined diameter each having a first and second end, said mandrels being selected from a group consisting of solid mandrels, tubular cylindrical mandrels and combinations thereof;

said plurality of mandrels having an optical fiber of a predetermined length with an input and an output end wrapped around each mandrel of the plurality of mandrels so as to form a continuous optical fiber sensing arm wound upon the plurality of mandrels;

an optical fiber of a predetermined length forming a reference fiber arm having an input and output end not wrapped around said mandrels;

an input and an output optical coupler respectively coupled to said input and said output optical cables, respectively, and to the input and output ends of the sensor and reference fiber arms, respectively, a coupler assembly comprised of input and output optical couplers and the reference arm embedded within an material having a bulk modulus of from $1 \times 10^{10}$ dynes/cm$^2$ to $10 \times 10^{10}$ dynes/cm$^2$; and, an encapsulant, having a Young's modulus less than the Young's modulus of each of the plurality of mandrels by at least a factor of two, encapsulating the plurality of optical fiber wound mandrels and said coupler assembly, wherein the thickness of the encapsulant is greater than the predetermined diameter of each mandrel, said encapsulant acting as an active element in determining the sensitivity of the sensor.

7. The acoustic sensor of claim 6 wherein said optical fiber forming said sensing arm is a continuous optical fiber snugly wrapped around each mandrel of the plurality of mandrels so as to form one continuous fiber optic sensing arm.

8. The acoustic sensor of claim 6 wherein said optical fiber forming the sensing arm is loosely wrapped around each mandrel of the plurality of mandrels so as to form one continuous optical fiber sensing arm.

9. The acoustic sensor of claim 6 wherein said encapsulant is natural rubber.

10. The acoustic sensor of claim 6 wherein said encapsulant is butyl rubber.

11. The acoustic sensor of claim 6 wherein said encapsulant is an elastomer.

12. The acoustic sensor of claim 11 wherein said elastomer is polyurethane.

13. The acoustic sensor of claim 6 wherein said plurality of mandrels are solid compliant mandrels.

14. The acoustic sensor of claim 6 wherein said assembly is disposed adjacent to at least one of the plastic blocks.

15. The acoustic sensor of claim 6 wherein at least one of said plurality of mandrels is a tubular cylindrical mandrel and said coupler assembly is disposed within at least one of said tubular cylindrical mandrel.

16. A fiber optic interferometric acoustic sensor system comprising:

a light source for providing a light beam;

an interferometric fiber optic sensor having sensing and reference arms responsive to light from said light source for producing an output optical signal containing an interference pattern proportional to a phase shift produced by an acoustic field being sensed by said interferometric fiber sensor, said interferometric fiber sensor further comprising a plurality of optical fiber wrapped mandrels selected from the group consisting of solid compliant mandrels, tubular cylindrical mandrels and combinations thereof;

an encapsulant material having a Young's modulus less than the Young's modulus of said mandrels by a factor of at least two encapsulating said interferometric fiber optic sensor to increase the sensitivity of said sensor; and detection means responsive to the output optical signal from said interferometric fiber sensor for developing a peak-to-peak photocurrent signal that has a peak-to-peak amplitude proportional to the amplitude of the acoustic field being sensed.

17. The acoustic sensor system of claim 16 further comprised of a means for processing the photocurrent signal.

18. The acoustic sensor system of claim 16 wherein said light source is a laser.

19. The acoustic sensor system of claim 18 wherein said laser is a solid state pumped Nd:YAG single mode laser.

20. A method of producing an acoustic fiber sensor comprising the steps of:

selecting a plurality of mandrels having first and second ends from a group comprised of solid compliant mandrels, tubular cylindrical mandrels and combinations thereof;

selectively wrapping an optical fiber having input and output ends around the plurality of mandrels so as to form a continuous sensing fiber arm having input and output ends;

preparing a reference fiber optic arm from a length of optical fiber having input and output ends;

connecting input and output optical couplers to respective input and output fiber optic cables and to the respective input and output ends of the sensor and reference fibers arms;

embedding the input and output fiber optic cables, the input and output optical couplers, and the reference fiber arm within an epoxy material having a bulk modulus of from $1 \times 10^{10}$ dynes/cm$^2$ to $10 \times 10^{10}$ dynes/cm$^2$, to form a coupler assembly;

encapsulating the plurality of fiber wrapped mandrels forming the sensing arm and the coupler assembly in a material having a Young's modulus less than the Young's modulus of the mandrels by a factor of at least two and a thickness of at least three times more than that of each of the mandrels.

* * * * *